(12) United States Patent
Holmes (10) Patent No.: US 10,578,219 B1
(45) Date of Patent: Mar. 3, 2020

(54) BREATHE AND DRINK AND SAFELY SWALLOW BITE VALVE

(71) Applicant: William August Holmes, Piedmont, CA (US)

(72) Inventor: William August Holmes, Piedmont, CA (US)

(*) Notice: Subject to any disclaimer, the term of this patent is extended or adjusted under 35 U.S.C. 154(b) by 0 days.

(21) Appl. No.: 15/949,559

(22) Filed: Apr. 10, 2018

Related U.S. Application Data (60) Provisional application No. 62/602,073, filed on Apr. 10, 2017, provisional application No. 62/606,851, filed on Oct. 10, 2017.

(51) Int. Cl.
*F16K 7/00* (2006.01)
*A47G 21/18* (2006.01)

(52) U.S. Cl.
CPC .............. *F16K 7/00* (2013.01); *A47G 21/185* (2013.01)

(58) Field of Classification Search
CPC ..... F16K 7/00; F16K 7/02; F16K 7/04; F16K 15/147; A47G 21/185; B65D 47/205; A61J 15/0092; B67D 2210/00131
USPC ...... 224/148.2; 220/714; 251/354, 341, 342, 251/343, 349
See application file for complete search history.

(56) References Cited

U.S. PATENT DOCUMENTS

| | | | |
|---|---|---|---|
| 5,699,933 A | 12/1997 | Ho et al. | |
| 5,971,357 A | 10/1999 | Denton et al. | |
| 6,039,305 A | 3/2000 | Hoskins et al. | |
| 6,070,767 A | 6/2000 | Gardner et al. | |
| 6,408,950 B1 * | 6/2002 | Shoup | A01B 73/065 111/57 |
| 6,497,348 B2 | 12/2002 | Forsman et al. | |
| 6,622,988 B2 | 8/2003 | Gill | |
| 6,764,064 B2 * | 7/2004 | Sturm | A45F 3/20 222/175 |
| 6,886,807 B1 | 5/2005 | Gill | |
| 8,011,529 B2 * | 9/2011 | Lien | A47G 19/2272 220/703 |
| 8,152,138 B2 | 4/2012 | Skillern | |
| 10,053,356 B2 * | 8/2018 | Rogers | A45F 3/16 |
| 10,203,039 B1 * | 2/2019 | Bretz | B65D 47/06 |
| 2007/0164037 A1 | 7/2007 | Chen | |

* cited by examiner

*Primary Examiner* — Craig J Price
*Assistant Examiner* — Andrew J Rost
(74) *Attorney, Agent, or Firm* — David Pressman (57) ABSTRACT

A bite valve (100) comprises an outer barrel (105) of low-friction, soft but durable, laterally-compressible material and a rigid axially moveable inner stem (110). Closing the valve urges the distal face of a stem-mounted gasket (115) distally against the sharpened tubular proximal end of a barrel-embedded flanged rigid sleeve (120) through which fluid passes. The stem is continually urged distally by captive compression spring (140) which pushes proximally against sleeve (120) and distally against a cap (135) mounted on the stem's distal end. When a user bites the barrel's indented exterior bite zone (150), two opposing sides of a conical surface (155) inside the barrel contact and slidably urge the stem proximally, pulling the gasket away from the sleeve end, thereby opening the valve. After drinking, a user releases their bite, allowing the spring to again move the stem distally, pushing the gasket back into a (default) sealing condition pressed against the sleeve's sharpened proximal end.

17 Claims, 6 Drawing Sheets

Fig. 2--SIDE VIEW

Fig. 3--PROXIMAL END VIEW

Fig. 4--DISTAL END VIEW

Fig. 5--SIDE VIEW

Fig. 6--END VIEW

Fig. 25--VALVE CLOSED

Fig. 26--VALVE OPEN

Fig. 27--VALVE OPEN

Fig. 28--VALVE IS CLOSED, NO BITE

Fig. 29--VALVE IS STILL CLOSED, PARTIAL BITE

Fig. 30--VALVE IS OPEN, FLOW IS POSSIBLE, FULL BITE

BREATHE AND DRINK AND SAFELY SWALLOW BITE VALVE

BACKGROUND—CROSS-REFERENCE TO RELATED CASES

This application claims priority of applicant's provisional patent applications, Ser. No. 62/602,073, filed 2017 Apr. 10, and 62/606,851, filed 2017 Oct. 10.

BACKGROUND—PRIOR-ART BITE VALVES

Proper hydration is essential to human health. When a suitable water supply is not readily available, as from a faucet or body of water, users carry portable reservoirs such as canteens, bottles, water bags, and the like. When a user, e.g., a biker, must have both hands free for other purposes, such as holding objects, they can convey water to the mouth via a tubular conduit. The conduit runs from a reservoir to a valve on the end of the tube. The valve is actuated when a user bites on it with their teeth. When the valve is open, a user then applies suction that draws water from the reservoir, through the conduit, through the valve, and into the user's mouth. Some prior-art bite valves employ a secondary shutoff valve that is located between a fluid reservoir and a bite valve in order to prevent leaks through an incompletely-closing bite valve.

BACKGROUND—PRIOR-ART REFERENCES

The following is a list of some possibly relevant prior art that shows various prior-art bite valves. Following this list I provide a discussion of these references.

U.S. Utility Patents

| Pat. or Pub. Nr. | Kind Code | Issue or Pub. Date | Patentee or Applicant |
| --- | --- | --- | --- |
| 5,699,933 | B1 | 1997 Dec. 23 | Ho et al. |
| 5,971,357 | B1 | 1999 Oct. 26 | Denton et al. |
| 6,039,305 | B1 | 2000 Mar. 21 | Hoskins et al. |
| 6,070,767 | B1 | 2000 Jun. 6 | Gardner et al. |
| 6,497,348 | B2 | 2002 Dec. 24 | Forsman et al. |
| 6,622,988 | B2 | 2003 Aug. 23 | Gill |
| 6,886,807 | B1 | 2005 May 3 | Gill |
| 8,152,138 | B2 | 2012 Apr. 10 | Skillern |
| 2007/0164037 | A1 | 2007 Jul. 19 | Chen |

In the following descriptions, the term "proximal" refers to the outlet of a valve, i.e., the portion of a valve that faces or delivers fluid to a user's mouth. The term "distal" refers to the inlet of a valve, i.e., the portion of a valve that faces or receives fluid from a conduit.

Ho shows a normally-closed bite valve comprising a housing, an axially-movable slide, an externally actuable button with a wedge and a wedge-shaped actuator in slidable contact with each other, and an O-ring in a valve seat. When a user wishes to open the valve, they apply a biting force to the button which causes the two wedges to urge the slide away from the O-ring, thereby opening the valve. While this design is workable, it requires the user to rotationally orient the valve body with respect to their teeth and it also provides a small target for the biting force. In addition, a user's teeth come into contact with hard surfaces causing an unpleasant sensation and possible damage to the user's tooth enamel.

Denton shows a fluid delivery valve that is suitable for use as a bite valve. His valve comprises an outer tube made of a flexible resilient material and an inner rigid bracing member. A supply tube is securely inserted into a distal end of the outer tube, i.e., the supply end, and held there by barbs that extend radially from the inner rigid bracing member. When a user inserts the proximal end of the outer tube into their mouth and then bites the outer tube, the outer tube is deformed inwardly where it is in contact with the user's teeth, and outwardly on the remaining two sides, creating an open conduit between the proximal and distal ends of the outer tube. When the user applies suction to the proximal end of the outer tube, fluid can flow from a reservoir into the user's mouth. This design has an advantage over Ho's in that any rotational orientation of the outer tube will work. Although barbs are used to secure the rigid inner member to the supply tube, it is still possible that a plurality of biting actions could cause the inner rigid member to dislodge from the supply tube and possibly enter a user's mouth, risking a choking event.

Hoskins shows a bite valve that operates in a manner similar to that of Denton. A rigid inner member comprises a bulkhead flange, a sealing surface with a plurality of openings, a post that rigidly connects the bulkhead flange and the sealing surface element, and a hose barb that provides a conduit for water from the barb, through the sealing surface, and up to the back of the bulkhead flange. The inner member is slidably inserted into a flexible outer tube and secured there by the sealing member. When the inner member is fully inserted into the outer tube, the outer end of the bulkhead flange is coincident with the proximal end of the outer tube. The bulkhead flange diameter is slightly greater than the relaxed inner diameter of the flexible outer tube and provides a water seal. When a user bites in the vicinity of the post, the outer tube is deformed into an oval, thereby opening the seal between the outer tube and the bulkhead flange and permitting fluid to pass. As with Denton's design, this design could be subject to wear and dislodging of the inner rigid member and thereby suffer from leaks and a possible choking hazard.

Gardner shows a bite valve comprising a flexible housing with a pair of lips in a flexible housing that are normally abutted together to form a seal. Biting the housing causes the lips to separate, thereby urging the lips to part and breaking the seal, permitting fluid to flow therethrough. Releasing the bite permits the lips to rejoin, restoring the seal. Although this design can work for a period of time, it can be prone to wear that degrades the quality of the seal and permits leaks to occur.

Forsman shows a personal hydration system comprising a reservoir, a tube that connects the reservoir to a valve (reference number 30 in most of FIGS. 1-28), and a tube from the valve to a mouthpiece that delivers fluid to a user's mouth. The valve is used to stop the flow of fluid when the mouthpiece is not in use. Although this system works, it employs an extra part, i.e., the valve, and requires actuation of the valve in order for the user to receive water, followed by another actuation of the valve to stop the flow of water.

Gill, U.S. Pat. No. 6,622,988, shows a mouthpiece valve comprising a substantially rigid body member that is attachable to a conduit at a distal end and a substantially rigid piston member at a proximal end that slidably moves coaxially within the body. Both members have flanges at their proximate ends. The piston is secured to the body by a spring that urges the piston to retract into the body, forming a fluid seal. A user opens the valve by urging their teeth between the respective flanges of the members, urging the piston away from the distal end of the body, thereby opening a seal within the body and permitting fluid to flow through the valve. Removing the user's teeth from the flanges permits the spring to urge the piston into the body, thereby closing the valve.

Gill, U.S. Pat. No. 6,886,807, shows a bite valve with a resilient piston inside a deformable body. A plug connected to the piston normally blocks a dispensing opening. When a user bites the body, the piston springably deforms and removes the plug from the dispensing opening, permitting fluid to flow through the valve. When the bite is removed, the piston returns to its original shape, urging the plug against the dispensing opening.

Skillern shows a bite valve with a rigid body that is partially covered by a flexible sheath. A movable piston, O-ring, valve seat, and spring reside in the body. The valve is normally closed as the piston is springably urged to extend from the body into the sheath, forming a first seal at the proximal end of the sheath. An O-ring simultaneously forms a second seal as the O-ring is springably compressed between the piston and a valve seat. The piston is shaped so that when a user bites the sheath near its proximate end, the inner surface of the sheath urges the piston in a distal direction, thereby opening both seals and permitting fluid to pass through the valve. When the bite is released, the piston is springably urged in a proximal direction, thereby closing the valve.

Chen shows a mouthpiece assembly with a cap. Chen's valve comprises a flexible sheath with an orifice, movable piston with a ramp and a plug end that forms a seal inside the sheath, and a spring that normally urges the piston in a proximal direction. When a user bites the sheath, an inner surface of the sheath contacts the outer surface of the piston and springably urges the piston in a distal direction, thereby opening the valve. When the bite is released, the spring urges the plug end against the orifice in the sheath and the valve is closed.

While all of these prior art devices may be suited for their particular use, they all suffer from one or more deficiencies. Those with hard exteriors are unpleasant to use and can damage a user's teeth. Some have internal components that can dislodge and enter the user's mouth, presenting a choking hazard. Some are made of such soft materials that they are torn apart by a user's teeth and many will deform and soon will fail to recover well and seal completely. Some require a secondary shutoff valve that is located between a fluid reservoir and a bite valve in order to prevent leaks through an incompletely-closing bite valve. Current bite valves, in actual use, do not often allow users to simply bite and drink and safely swallow liquids. As is explained in detail below, in the "Conclusions, Ramifications and Scope" section of this Application, they instead require a user to gulp and breathe simultaneously and rapidly, which frequently leads to inhalation of liquids. This is commonly experienced when using current bite valves, and this highly unpleasant problem should be greatly eliminated by the present bite valve. The present valve allows a user room and time to breathe while they drink and safely swallow at their own pace, without taking liquid into their windpipe.

SUMMARY

The bite valve and its various embodiments described below overcome one or more of the deficiencies of prior-art devices while safely satisfying the hydration needs of a user—allowing them to safely swallow without fear of aspirating liquids. Applying a bite force to the exterior of the valve causes it to open, thereby allowing fluids to pass therethrough. Releasing the bite force causes the valve to close completely without the need for a secondary, manually operated valve. A laterally compressible, soft but durable exterior protects a user's teeth and shields inner components from damage by the teeth. A plurality of interior parts are thus protected, securely contained, and not subject to being dislodged. A valve body is threaded at an input end to permit secure attachment to a hose barb or other fluid coupling. An optional threaded hose fitting contains a captive, quickly cleanable, replaceable filter screen element to block and exclude incoming debris. The threaded hose fitting is easily disconnected without tools from the valve body in order to expel debris. The bite valve and hose barb are secured to a tubular conduit that delivers fluids from a reservoir. The "Conclusions, Ramifications and Scope" section of this application provides a detailed list of ways in which the present bite valve is an improvement over the prior art.

REFERENCE NUMERALS

100 Bite valve
105 Barrel
110 Stem
115 Gasket
120 Sleeve
125 O-ring

130 Flange-retaining groove
135 Cap
140 Spring
145 Threads
150 Indented Bite Zone
151 Bite rest zone
155 Inner conical surface (Inside barrel's proximal end)
156 Deformed unsloped inner proximal surface
220 Neck
225 Inner cylindrical O-ring sealing wall
230 Distal cylindrical inner wall surface
235 Barrel outer distal cylindrical tip
500 Stem proximal nub
505 Proximal end stem proximal nub
510 Stem proximal nub rounded distal surface
515 Cylindrical shaft portion
520 Gasket flange
525 Sloped surface on proximal side of gasket flange
530 Gasket flange distal face
535 Cylindrical shaft portion
540 Proximal cylindrical fins connector
545 Shaft portion
550 Stem distal nub
555 Distal nub proximal unsloped portion
560 Distal nub central sloped portion
565 Distal nub distal unsloped portion
570 A, B, C, D Fins
1000 Proximal sharpened tubular edge
1010 Sleeve flange
1200 Cap distal mounting hub
1210 A, B Cap anti-rotational engagement slots
1800 Sleeve insertion tool
1805 Tapered end
1810 Shoulder
2200 Mounting pedestal
2205 Cap insertion tool
2300 Connector
2305 Conduit
2310 Reservoir
2315 Filter screen insert
2400 A, B Teeth
2405 A, B Lips
2410 A,B Distal and proximal flow arrows
2600 A, B Left side and right side proximal barrel flow openings
2800 Barrel inner protruding proximal circular ridge

Figure 1:
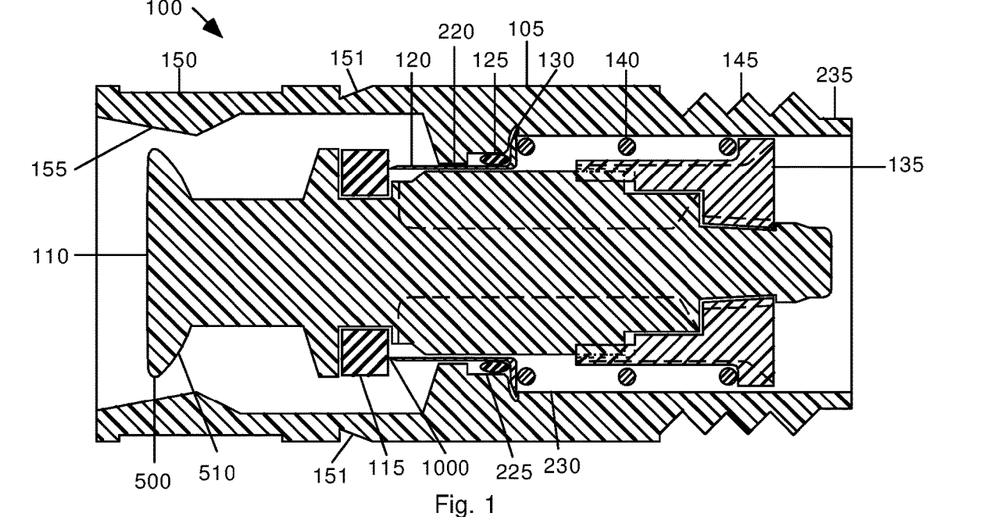
FIG. 1 shows a cross-sectional side view of a bite valve according to one aspect of an embodiment.

DESCRIPTION—OVERVIEW OF BITE VALVE—FIG. 1

FIG. 1 is a cross-sectional side view of an assembled and closed bite valve according to one aspect of a first embodiment. A bite valve 100 comprises a laterally compressible tubular barrel 105 comprised of low-friction material that houses a valve stem 110. A resilient gasket 115 is secured to stem 110 and forms a valve seat. Near the longitudinal center of the barrel, a flanged cylindrical sleeve 120 is secured inside barrel 105 within an internal groove 130. At the left-hand (proximal) end, a sharpened tip 1000 of sleeve 120 presses against gasket 115 when valve 100 is in its default condition, which is a closed condition. Spring 140 constantly pushes distally against cap 135, thereby urging stem 110 and gasket 115, mounted thereon, in the distal direction. This prevents flow through valve 100 until a user, wishing to drink, bites two opposing sides of the barrel's exterior indented bite zone 150 near the proximal end of the valve. This in turn pushes two opposing sides of inner conical surface 155 toward the center axis of stem 110, thereby urging stem 110 and its attached gasket 115 in the proximal direction, strongly enough to overcome the distal urging of spring 140 on stem 110. Liquid can now flow through valve 100. (Stated otherwise, surface 155 is a camming surface which, when moved toward stem 110 by a bite, cams surface 510, a cam follower, to the left.)

An O-ring 125 is radially compressed between the outer surface of sleeve 120 and the inner surface 225 of barrel 105 and provides an annular fluid seal. An end cap 135 is secured to the distal end of stem 110 and a compression spring 140 bears against cap 135 and the right-hand (distal) end of sleeve 120, thereby urging stem 110 to move (distally) to the right in this figure and closing valve 100. Spring 140 has a plurality of windings, but for simplicity of illustration, only the cross-sections of three windings are shown by the six hatched circles on both sides of sleeve 120. A barrel internal conical surface 155, near the barrel's proximal end, is used to urge stem 110 (proximally) to the left when valve 100 is activated, i.e., opened, as described above. A plurality of threads 145 is used to secure valve 100 to an associated hose barb and optional filter assembly (not shown in this figure). Threads 145 can be replaced with a smooth or barbed or otherwise formed surface for receiving a hose clamp or spring-loaded hose coupling. Indented bite zone 150 on the exterior surface of barrel 105 is a bite locator for a user's teeth.

In one aspect, a second, differently-shaped indentation 151 in the exterior surface of barrel 105 is a non-activating notched bite-rest zone for a user's teeth. A user can grip the valve there, comfortably between their teeth for an extended period, if desired, without inducing flow. In the following description, the left-hand end of valve 100 is situated in the user's mouth and is referred to as the "proximal" end. The threaded right-hand end of valve 100 is connected to a mating threaded hose barb or to a filter-containing hose fitting (described below) connected to that hose barb, and is called the "distal" end.

Figure 2:
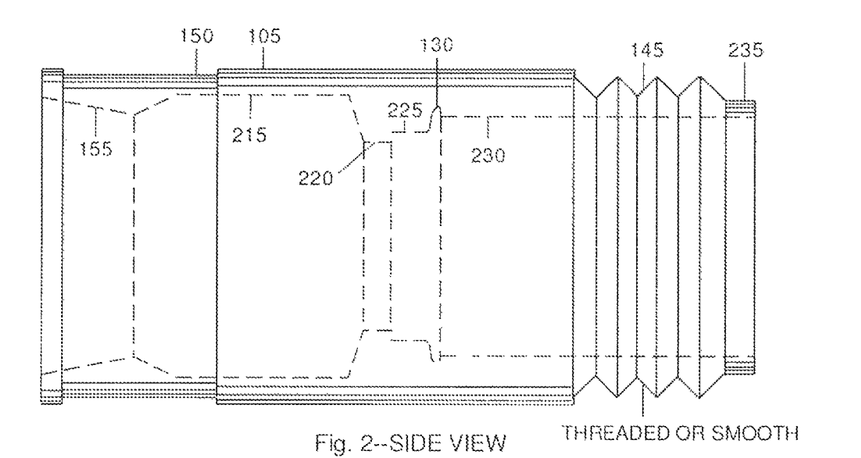
FIGS. 2 through 4 respectively show side, proximal end, and distal end views of a barrel according to one embodiment.
Figure 3:
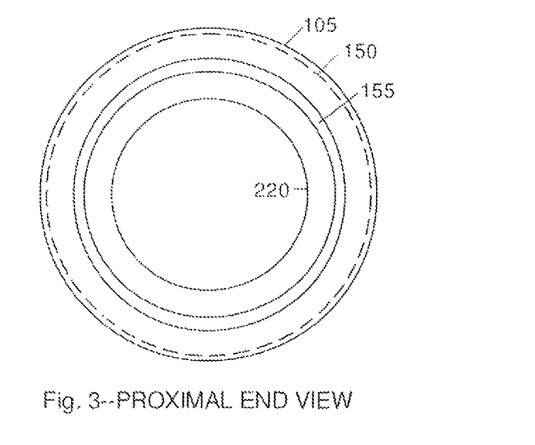
Figure 4:
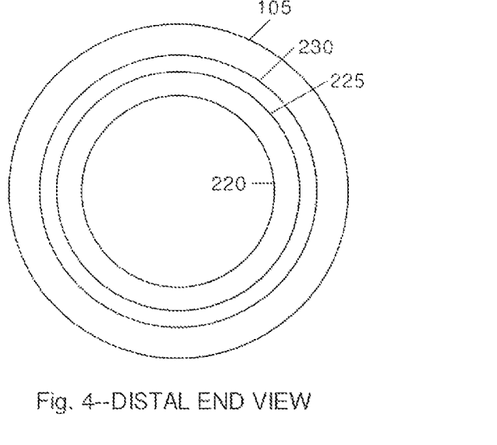

Description of Components—FIGS. 2 Through 14—Barrel 105—FIGS. 2 Through 4

FIGS. 2 through 4 respectively show side, proximal, and distal end views of exterior barrel 105 according to one aspect. At the proximal end of barrel 105 a sloped interior conical surface 155 is used to urge stem 110 (FIG. 1) to move in an axial direction, as described herein. An exterior indented bite zone 150 is adjacent region 155.

A neck region 220 in barrel 105 supports sleeve 120 (FIG. 1). An inner wall section 225 provides an outer annular sealing surface for O-ring 125 (FIG. 1), and distal inner wall surface 230 slidably supports cap 135 and spring 140 (FIG. 1).

Barrel outer distal cylindrical tip 235 projects about one thread width beyond the distal end of threads 145 in order to facilitate insertion of valve 100 into the threaded entrance of a hose barb. Barrel 105 is 29 mm long with an outer diameter of 12.7 mm, although other sizes can be used if all the components of the valve and their relative positions are scaled accordingly, as indicated in FIG. 1.

FIGS. 3 and 4 show proximal and distal end views, respectively, of barrel 105.

In one aspect, barrel 105 is made of virgin or other non-toxic polytetrafluoroethylene (PTFE, sold under the trademark Teflon, by The Cemours Company of Wilmington, Del.), although it can be made of other low-friction, compressible, non-toxic, soft but durable, materials including other non-toxic fluoroplastics, such as FEP (fluorinated ethylene propylene). In the present aspect, barrel 105 is machined from rod or tubing using a lathe, screw machine, or other material forming device. Most other semi-flexible materials such as high-durometer silicone rubbers and the like have high coefficients of friction and are less suitable. Health and safety requirements discussed below may further limit the number of available choices.

Figure 5:
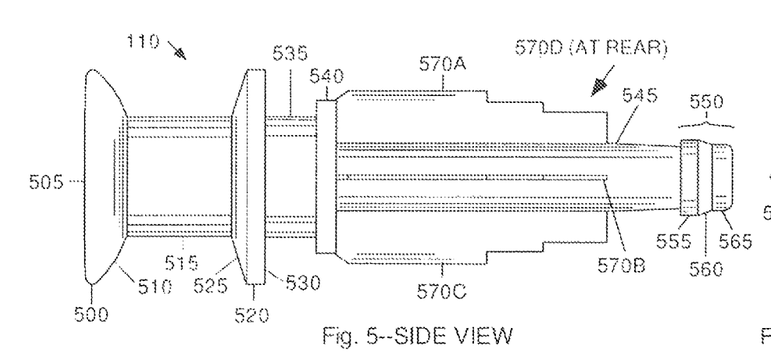
FIGS. 5 and 6 respectively show side and distal end views of a stem according to one aspect of an embodiment.
Figure 6:
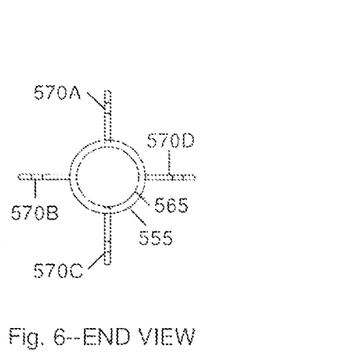

Stem 110—FIGS. 5 and 6

FIGS. 5 and 6 show side and proximal end views, respectively, of a stem 110 according to one aspect. Stem 110 is made from a single piece of rigid material and comprises a rounded proximal end nub 500 having a flat proximal-facing surface 505 and a rounded distal-facing portion 510. A gasket flange 520 has a sloped surface 525 facing in the proximal direction and a flat surface 530 facing in the distal direction. Sections 500 and 520 are joined by a cylindrical shaft portion 515. A proximal cylindrical fins connector 540 is joined to flange 520 by a cylindrical shaft portion 535 on its proximal side and connects the proximal ends of stepped fins 570 A, B, C, and D, stabilizing them. A third shaft portion 545 extends from section 540 to an adjoined distal end nub section 550 comprising a proximal unsloped portion 555, a central sloped portion 560, and a distal unsloped portion 565 that has a rounded distal end.

A plurality of stepped fins 570A, B, C and D on shaft 545 extend in a distal direction from section 540 to which they are joined at their proximal ends. Fins 570A, B, C, and D divide flow more uniformly through valve 100 and thereby encourage laminar flow when valve 100 is open, reducing resistance to fluid flow and thereby allowing a user to use less suction when valve 100 is in use and to more easily aim the valve output where desired in the mouth. Shaft 545 is tapered between the ends of fins 570A, B, C, and D and the proximal end portion 555 of section 550. The exterior surfaces of fins 570A, B, C, and D are sized and shaped to fit precisely through the inside of sleeve 120. This insures that the sharpened proximal end of sleeve 120 contacts the distal face of gasket 115 precisely where it should each time, ensuring an airtight seal.

Stem 110 is made of a rigid material such as an acetal copolymer, sold under the trademark Delrin, by E. I. DuPont de Nemours Company of Wilmington, Del., or an acetal homopolymer, sold under the trademark Celcon, by Celanese Corporation of Dallas, Tex. It can be injection molded or machined. Other materials including metal, or other rigid high-strength non-toxic plastics with low coefficients of friction can be used. However, they preferably should satisfy health and safety requirements, as mentioned. Also, PEEK, or polyetheretherketone, especially that made by Solvay Chemicals of Princeton, N.J., and sold under the trademark KetaSpire PEEK, can be used. The latter has NSF, International (formerly the National Sanitary Foundation) approval and FDA (Food and Drug Administration) approval in natural color only. It is of utmost importance that there be a low coefficient of friction where the stem material contacts the barrel material and also any place it contacts the inside of the sleeve, where it has a very close fit.

Figure 7:
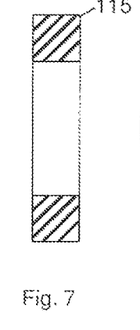
FIGS. 7 and 8 respectively show cross-sectional and end views of a gasket.
Figure 8:
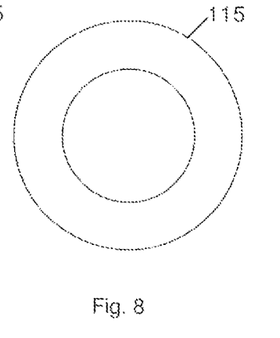

Gasket 115—FIGS. 7 and 8

FIGS. 7 and 8 show cross-sectional and end views of gasket 115. It is made of a resilient non-toxic material such as polyurethane of durometer hardness 40 to 80, although other hardnesses and non-toxic materials such as buna-n rubber or ethylene propylene can be used. Gasket 115 is sold as a "square" O-ring by numerous vendors, such as O-Rings Inc., of Los Angeles, Calif. India rubber or natural rubber can easily be compromised by immersion in boiling water for sterilization purposes and is therefore not a good choice for a gasket in this valve.

Figure 9:
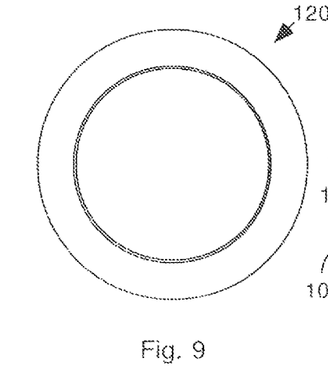
FIGS. 9 and 10 respectively show proximal end and side views of a sleeve.
Figure 10:
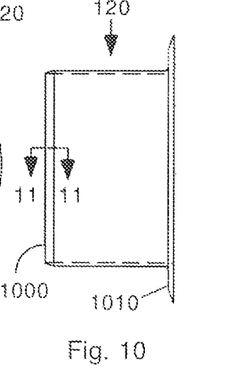
Figure 11:
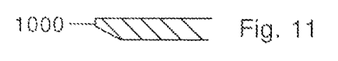
FIG. 11 shows a cross-sectional view of an edge of the sleeve in FIGS. 9 and 10.

Sleeve 120—FIGS. 9 Through 11

FIGS. 9 and 10 show end and side views, respectively, of sleeve 120. Sleeve 120 comprises a tubular portion and a flange 1010 at one end. FIG. 11 shows an enlarged detail of a sharpened proximate edge 1000 of sleeve 120. Edge 1000 presses against gasket 115 when valve 100 is closed (FIG. 1). To avoid an overly-thin and fragile edge, and to prevent edge 1000 from cutting into gasket 115, the edge is slightly "broken", i.e., rounded or flattened by a small amount, such as a radius of 0.05 mm. Sleeve 120 is made of stainless steel number 316 or 302, although other rigid, strong, non-toxic materials can be used. It is machined from bar or tubing stock using a lathe or screw machine. It can also be formed by the well-known processes of stamping, drawing, or spinning on a lathe.

O-Ring 125—FIG. 1

O-ring 125 is a standard, off-the-shelf product that is sold by the vendor listed above and others. Its inner diameter is sized to be stretchably slid onto sleeve 120. Its cross-sectional diameter of about 1 mm is sized so that it is compressed into an oval shape between sleeve 120 and barrel 105, as shown in FIG. 1. It is preferably made of PTFE or other low-friction non-toxic compressible heat-resistant polymers.

Figure 22:
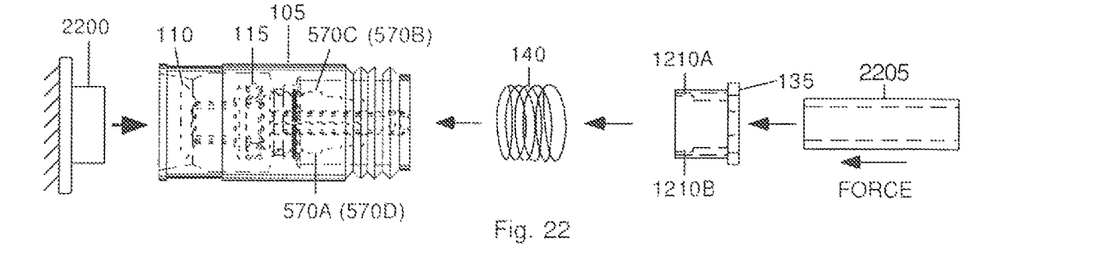
Figure 24:
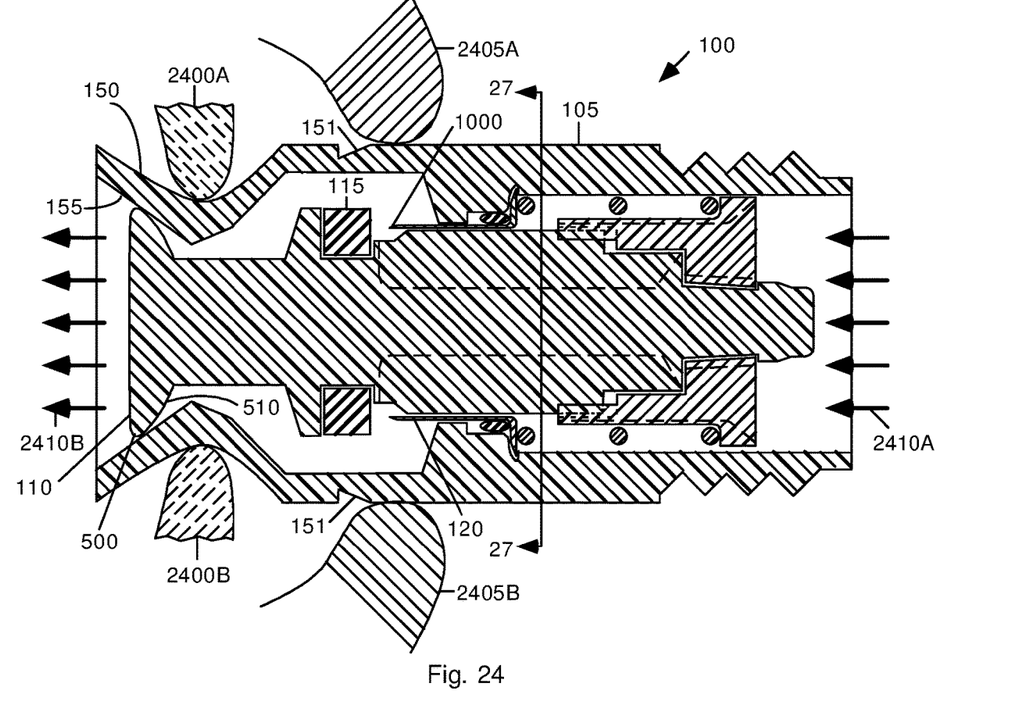

Spring 140—FIGS. 1, 22 and 24

Spring 140 is a standard, off-the-shelf coil compression spring. It is sized to slidably fit over the proximal end of cap 135 and also slidably move within the inner surface of barrel 105, as shown in FIGS. 1 and 2. It is made of stainless steel type 316 or 302 and has a spring constant of about 6, although other non-toxic alloys resistant to salty liquids, and other spring constants can be used.

Figure 12:
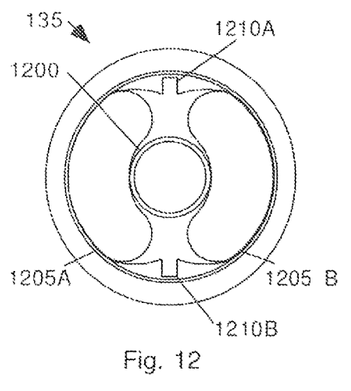
FIGS. 12 through 14 show proximal end, side, and distal end views of a cap according to one aspect of an embodiment.
Figures 13, 14:
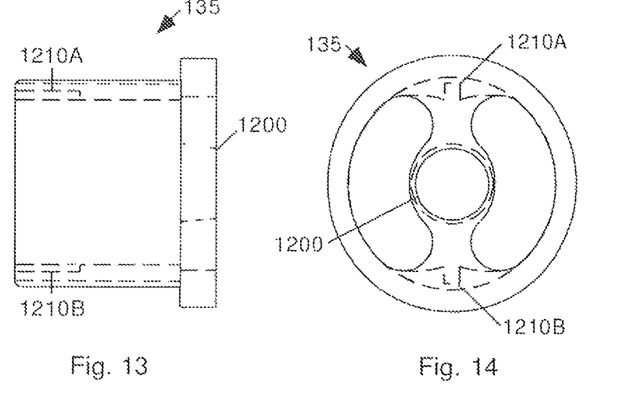

Cap 135—FIGS. 12 through 14

FIGS. 12 through 14 show proximal end, side, and distal end views, respectively, of cap 135. A conical distal mounting hub 1200, centered in the cap's flanged distal end, is sized to stretchably admit end section 550 of stem 110, starting with section 550 and then proceeding with sloped section 560 and finally section 555. The diameter of the distal end of hub 1200 is approximately equal to the diameter of shaft 545 where shaft 545 meets section 555 (FIGS. 5 and 6). A pair of anti-rotational engagement slots 1210A and 1210B are positioned to receive the distal tips of two oppositely disposed fins 570A and 570C, or 570B and 570D, of stem 110 (FIGS. 5 and 6) during assembly of valve 100, as described below. Cap 135 is made of the same material as stem 110, although other non-toxic low-friction materials with similar mechanical properties can be used, such as Solvay's KetaSpire PEEK in natural color. As with the stem, the material chosen for the cap should have a low coefficient of friction where it contacts the barrel.

Figure 15:
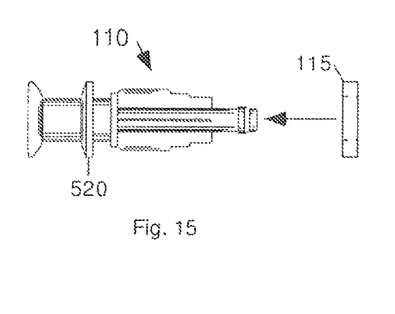
FIGS. 15 and 16 are side views showing the assembly of a gasket onto a stem.
Figure 16:
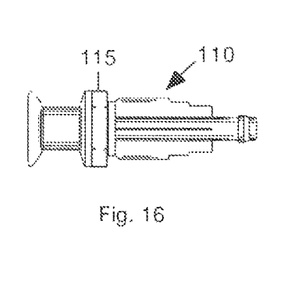

Assembly of Components—FIGS. 15 to 22—Stem 110 & Gasket 115—FIGS. 15 and 16

FIGS. 15 and 16 respectively show before and after side views of the assembly of stem 110 and gasket 115. In FIG. 15, gasket 115 is oriented with its axis aligned with the axis of stem 110. Gasket 115 is then stretchably urged onto stem 110 until it reaches the distal side of gasket flange 520 of stem 110. This step can be accomplished manually or with a tool that is fashioned to stretch gasket 115 as it moves over the distal end of stem 110.

Insertion of Sleeve 120 and O-Ring 125 into Barrel 105—FIGS. 17 Through 20

Figure 17:
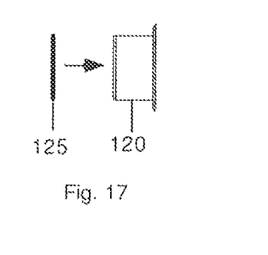
FIG. 17 is a side view showing the installation of an O-ring onto a sleeve.
Figure 18:
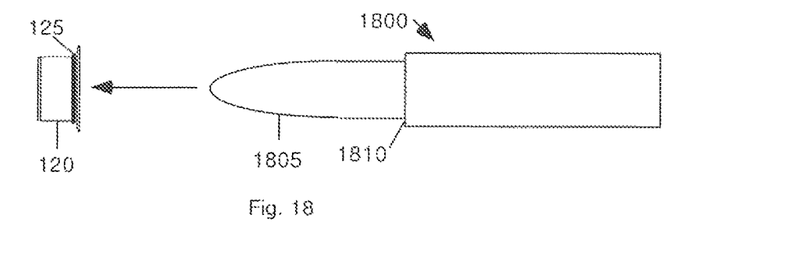
FIGS. 18 through 20 show the installation of the sleeve and O-ring of FIG. 17 into a barrel.
Figure 19:
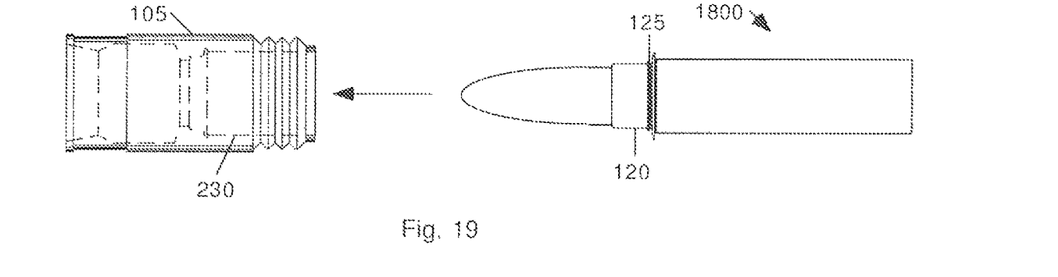
Figure 20:
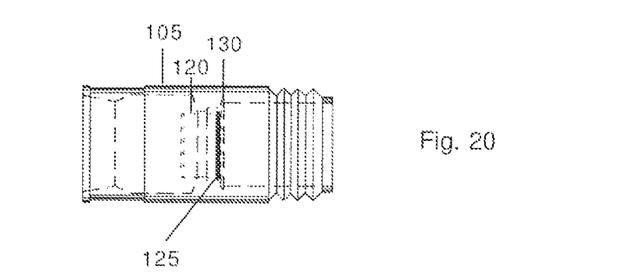

FIG. 17 shows a side view of O-ring 125 and sleeve 120 with their axes aligned and ready for assembly. FIG. 18 shows a side view of O-ring 125 installed on sleeve 120 and a sleeve insertion tool 1800 that is used to insert sleeve 120 and O-ring 125 into barrel 105 of valve 100 (FIG. 1).

Sleeve insertion tool 1800 has a tapered end that is used to guide and center tube 125 into the distal end of barrel 105 as it is inserted. A shoulder 1810 on sleeve insertion tool 1800 has a diameter that is slightly greater than the inner diameter of sleeve 120, yet smaller than flange 1010 of sleeve 120 (FIG. 10). The remainder of sleeve insertion tool 1800 is gripped by a user or a machine and is used to urge sleeve 120 into barrel 105. The flange 1010 of sleeve 120 is tapered by approximately 45 degrees or more, and polished, near the outer edge of its proximal side to facilitate its insertion into barrel 105. The proximal face of flange 1010 urges O-ring 125 axially into a radially-compressed annular sealing position between sleeve 120 and barrel 105.

The inner distal surface 230 of barrel 105 is approximately 0.3 mm smaller than the maximum outer diameter of flange 1010 (FIG. 10) of sleeve 120. During installation of sleeve 120 into barrel 105, sleeve insertion tool 1800 forcibly urges sleeve 120 into barrel 105 by very slightly stretching barrel 105 until flange 1010 snaps into flange-retaining groove 130 in barrel 105, thereby securing sleeve 120 in barrel 105.

Figure 21:
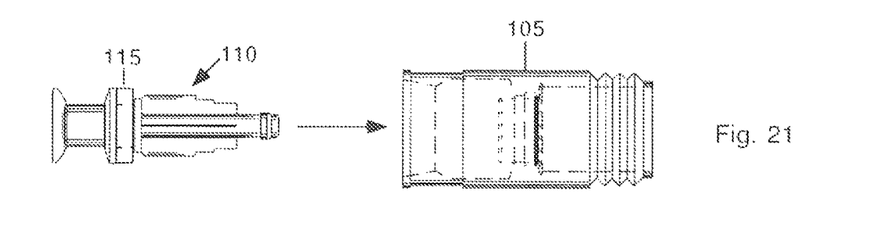
FIGS. 21 and 22 are side views showing the assembly of a stem, barrel, spring, and cap.

Insertion of Stem 110 and Gasket 115 into Barrel 105—FIG. 21

FIG. 21 shows stem 110 with gasket 115 in place and positioned for insertion into the proximal end of barrel 105, as indicated by the arrow between them.

Installation of Cap 135 and Spring 140 into Barrel 105—FIG. 22

FIG. 22 shows the installation of cap 135 and spring 140 into barrel 105 and onto the proximal end of stem 110. Spring 140 is first slidably placed on cap 135. Cap 135 is then rotated about its axis until one of grooves 1210A or 1210B is aligned with one of fins 570A, 570B, 570C, or 570D (FIGS. 5 and 6). Cap 135 is then urged into the distal end of barrel 105 while two of fins 570(A, B, C, D) slidably engage grooves 1210A and 1210B. During this installation step, stem 110 is restrained from moving in a proximal direction by mounting pedestal 2200 which is inserted into the proximal end of barrel 105 while spring 140 and cap 135 are urged into the distal end of barrel 105, as described below.

When shaft portion 565 of stem 110 is urged into the proximal end of mounting hub 1200 of cap 135, the diameter of hub 1200 is resiliently increased to accept portion 565. This continues as shaft portions 560 and 555 are further urged through hub 565. When portion 555 exits the distal end of hub 1200, the diameter of hub 1200 resiliently recovers to its former size which is smaller than shaft portion 555, thereby preventing the separation of stem 110 and cap 135 and securing spring 140 in place, as shown in FIG. 1.

As mentioned, tools may be used in this step. A mounting pedestal 2200 with diameter slightly less than the proximal end of stem 110 is supported axially on its proximal end and is used to hold stem 110 in place within barrel 105. A sturdy cap insertion tool 2205 with center bore diameter greater than the diameter of section 555 of stem 110 and outer diameter less than the distal end diameter of cap 135 is then used to urge cap 135 onto stem 110.

Figure 23:
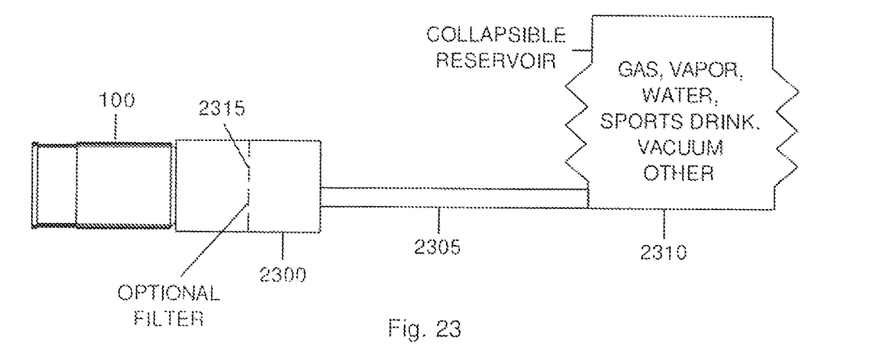
FIG. 23 shows a schematic drawing of a bite valve, connector, conduit, and reservoir assembled for use.

Attachment of Valve 100 to a Source of Fluids to Form a Hydration System—FIG. 23

FIG. 23 shows a schematic view of a hydration system comprising valve 100, which is threadably connected to a hose connector 2300. Connector 2300 is in turn connected to a fluid conduit 2305, which is in turn connected to a fluid source 2300. In this aspect, source 2300 is a collapsible reservoir 2310. The fluids in source 2310 can be a gas, water, sports drinks, vapors, mists, or any other fluid that a user of the system requires. In addition, because of the high quality of the seal formed between gasket 115 and sleeve 120 (FIG. 1), reservoir 2310 can be evacuated, providing a bite-activated vacuum for urging fluids to flow in a distal direction. Connector 2300 contains a captive optional filter element 2315 that prevents undesired particulate matter from entering the distal end of valve 100 as fluids move from source 2310 to valve 100.

Operation of Valve 100—FIGS. 1, 24, 25 and 26

FIGS. 1 and 24 respectively show cross-sectional side views of valve 100 in closed and open conditions. In FIG. 1, spring 140 has urged cap 135, gasket 115 and stem 110 in a distal direction within barrel 105. Edge 1000 of sleeve 120 is firmly lodged against the distal side of gasket 115, thereby preventing the flow of fluids from the distal end to the proximate end of valve 100.

FIG. 24 shows a user's upper and lower teeth 2400A and 2400B, respectively, biting and deforming barrel 105 in the region of indented bite zone 150. In this condition, two opposing sides of inner conical surface 155 are compressed radially toward stem 110, slidably contacting the rounded proximal nub 500 of stem 110 and urging it to move in a proximal direction. (Stated otherwise, surface 155 is a camming surface which cams cm follower surface 510 to the left.) When stem 110 is in this position, edge 1000 of sleeve 120 is no longer in contact with the distal side of gasket 115, thereby opening a path for fluid to flow from the distal end to the proximal end of valve 100. A user's upper and lower lips, 2405A and 2405B respectively, are pressed to seal around barrel 105 in a region that is distally adjacent to indented bite zone indentation 150. When this is done, a user can apply suction to the proximal end of barrel 105 and draw fluid through valve 100, as indicated by distal flow arrows 2410A at the distal entrance to valve 100 and proximal flow arrows 2410B at the proximal outlet end of valve 100. Unlike current valves, the present valve will not allow fluid to pass through the valve and into the user's mouth until the user, as indicated by their biting the valve, is fully ready to receive flow into their mouth. This protects the user from unintended aspirations of liquid. In other words, by excluding unanticipated liquids the user can relax and simply bite and drink and safely swallow liquids only when they wish to.

Figure 25:
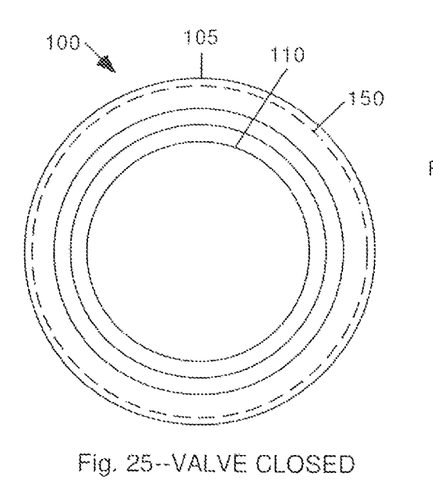
FIGS. 25 and 26 respectively show proximal end views of a complete valve in a normally closed condition and in an open condition.
Figure 26:
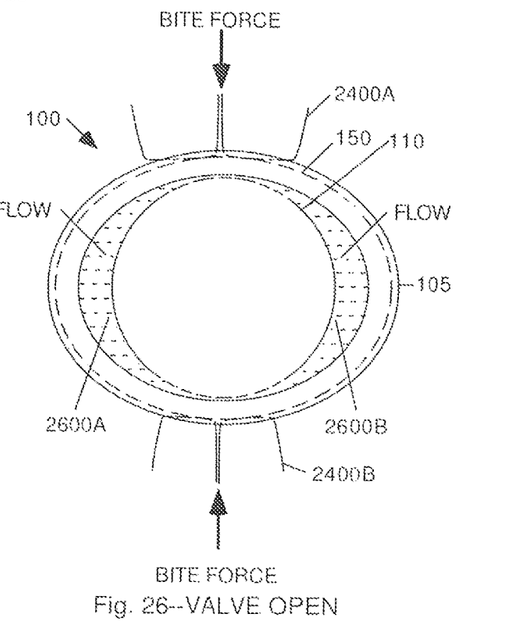
Figure 27:
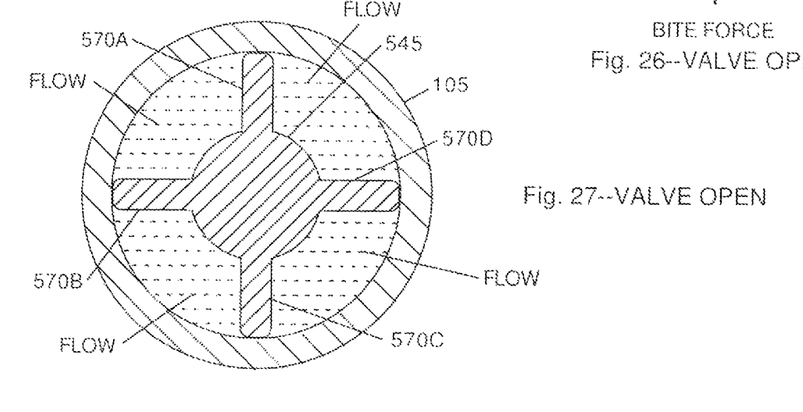
FIG. 27 is an axial cross-sectional view of a portion of FIG. 24, shown looking toward the proximal end of a valve in the open condition.

FIGS. 25 and 26, respectively, show proximal end views of valve 100 in closed and open conditions. In FIG. 25, a user's teeth have not yet bitten barrel 105 and barrel 105 has a circular shape. In FIG. 26, a user's teeth are biting and deforming barrel 105, as shown in FIG. 24, and valve 100 is open. In addition, teeth 2400A and 2400B have compressed barrel 105 in indented bite zone 150, causing the proximal end of barrel 105 to assume an elliptical shape with enlarged openings 2600A and 2600B on the sides. These openings provide a path for fluids to flow through valve 100 when stem 110, and gasket 115 mounted thereon, are moved proximally away from the proximal end of sleeve 120. After drinking, when a user releases their lateral bite force, the continuous axial force of spring 140 pushes stem 110 and its attached gasket 115 in the distal direction until the distal face of gasket 115 is pushed distally into an airtight seal against the sharpened circular proximal edge 1000 of sleeve 120 and flow through valve 100 ceases. This closed condition, essentially, is the default condition of valve 100, which closes automatically once the user releases their lateral bite force.

Figure 28:
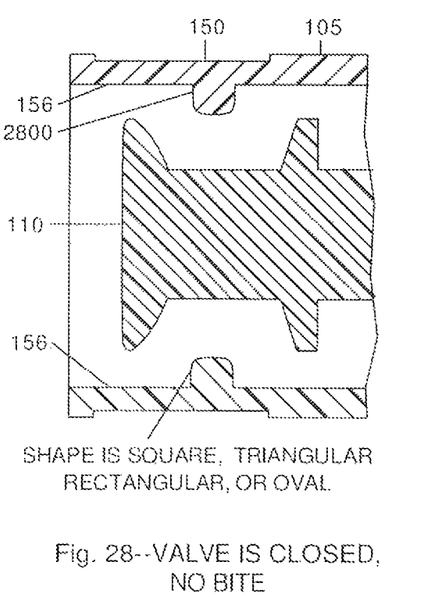
FIGS. 28 through 30 show the proximal end of an alternative embodiment according to one aspect of a bite valve, where, respectively, (a) the valve has not yet been bitten (flow not yet possible), (b) the valve has only been bitten approximately halfway (still no flow possible), and (c) after the bite has progressed enough to begin to allow flow through the valve.
Figure 29:
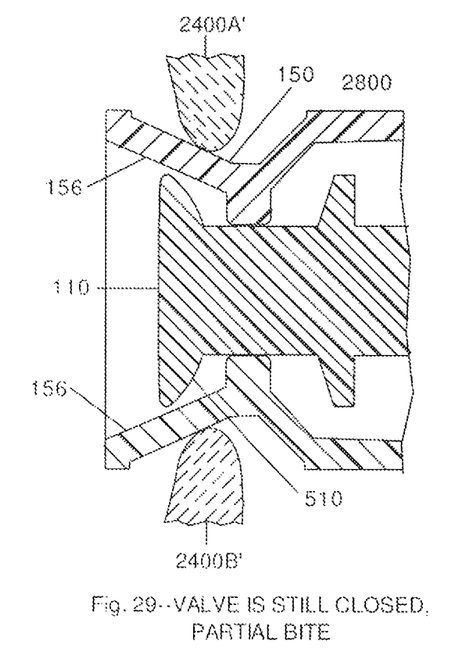
Figure 30:
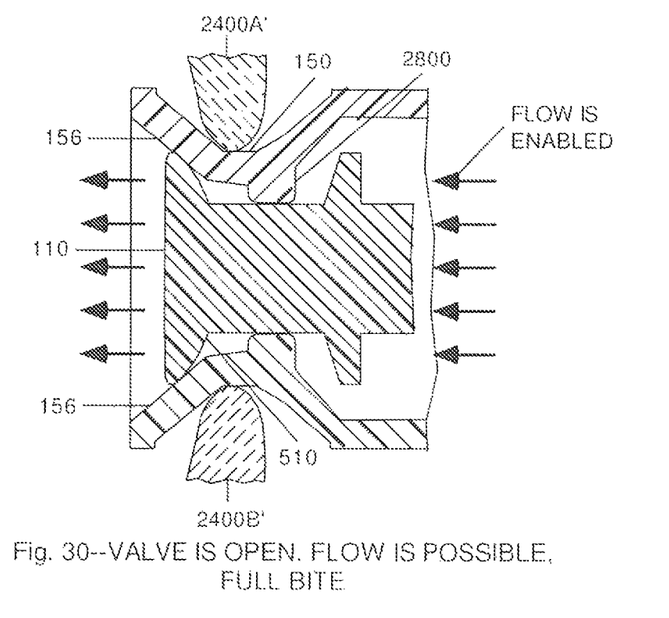

Alternative Embodiment—FIGS. 28 Through 30

FIGS. 28, 29, and 30 show cross-sectional side views of one aspect of the proximal end of an alternative embodiment of valve 100. In these figures an inner-protruding proximal circular ridge 2800 protrudes from inner proximal unsloped surface 156, which is axially located adjacent to indented bite zone 150. In FIG. 28 this ridge is not in contact with stem 110. FIG. 29 shows a user's teeth 2400A' and 2400B' after they have begun biting barrel 105 laterally within indented bite zone 150. FIG. 30 shows a user's teeth 2400A' and 2400B' forced more closely together, thereby further deforming the just-deformed unsloped proximal inner proximal barrel surface 156 and causing it to contact and urge proximal nub 500 of stem 110 in the proximal direction to open valve 100 and make flow possible therethrough. (In an alternative surface 156 can be inside the barrel's proximal end)

As described, FIGS. 28, 29, and 30 respectively show the proximal end of the above alternative embodiment (a) before being bitten (flow not yet possible), (b) when the bite is approximately halfway completed (flow still not possible), and (c) after the bite has progressed enough to begin to allow flow through the valve. The user's teeth are able to sense strong resistance to lateral compression in two places within the indented bite zone 150, i.e., where ridge 2800 laterally contacts stem 110 and also where nub 500 laterally contacts the inner wall of barrel 105. However, axially in between these two compression-resistant areas a user's teeth are able to sense a "softer" area, with much less resistance to being compressed. Biting in this area, as shown in FIGS. 29 and 30, pushes the opposing reduced-thickness (and thus increased-flexibility) barrel walls of the indented bite zone 150 toward each other. This causes the portion of the barrel wall 156 on the proximal side of the user's bite to deform conically into a shape that, when compressed, urges the stem's rounded proximal nub in the proximal direction and allows flow through valve 100. This conical deformation of an originally unsloped thinner barrel wall provides more control of flow by the user than does lateral compression of a thicker pre-formed conical inner wall surface against the stem's proximal nub.

In cross-section, protruding circular ridge 2800 can be oval, square, rectangular, or triangular, all with rounded corners.

CONCLUSIONS, RAMIFICATIONS, AND SCOPE

The present bite valve can deliver fluids on demand from a reservoir to a user's mouth. A laterally-compressible, relatively soft, but durable, outer barrel houses a rigid axially movable stem with a gasket that seals when pressed against the sharpened tubular end of a rigid sleeve. The soft but durable barrel material is gentle on a user's teeth and has a low coefficient of friction, reducing the bite force a user needs to apply to induce flow. The barrel has an indented bite zone adjacent a proximal end that guides a user's teeth to a target bite zone. To obtain fluid from a reservoir, a user seals their lips around the valve body and then bites the valve, causing its internal stem to move in a proximal direction, thereby opening a gasket seal. The user then applies suction to draw a fluid through the valve. When the bite force is released, the valve closes with an air-tight seal. The seal prevents back-flow from the valve into a reservoir so that next time the valve is used, a fluid is immediately available at the distal end of the valve. Alternatively, a user can, after drinking, blow any liquid in exposed hoses back into their reservoir. This will provide cooler drinks during hot weather and prevent blockages of ice during freezing weather.

The present valve has the following advantages over the vast majority of prior bite valves:

It doesn't leak, which prevents spills and wasted water.

The indented bite zone orients itself quickly in the mouth, saving time.

An available screen washer, easily attachable and detachable, mounted captively inside a small in-line threaded, demountable, cleanable and reattachable fitting, serves to exclude incoming debris from incoming fluids.

It shuts off flow automatically without requiring the use of a secondary shutoff valve. Turning secondary shut-off valves on and off requires the use of both hands, so, not needing a secondary shut-off valve allows a cyclist to keep one hand on their handlebars at all times, or a soldier to constantly keep one hand on their weapon. This makes hydration—especially the swallowing of liquids—less hurried and much safer.

It assumes an elliptical shape when laterally compressed by the teeth. An elliptical shape, being less tall, is more comfortable in the mouth for extended periods.

It has a slimmer profile for any amount of flow desired, and it is scalable to any amount of flow desired. This reduces interference with breathing.

Being smaller, it does not need to be moved in and out of the mouth hurriedly to allow breathing while hydrating. This allows users to safely swallow at their own pace, which makes them less likely to inhale liquids.

Every component is captively connected within the valve, making any dislodgement or inhaling of loose parts highly unlikely, barring any unexpected exterior damage to the valve.

A user can drink with minimal use of their hands. This allows a soldier to remain less visible when in the field and allows a cyclist to maintain a better grip on their handlebars.

It can be quickly and safely sterilized in hot water without damage.

It field-cleans quickly without tools—a user can simply unthread, bite, and blow away debris.

Its airtight seal lets a user, after drinking, quickly blow liquid from exposed hoses back into their reservoir. This provides cooler drinks during hot weather and prevents ice blockages during freezing weather.

Tougher more durable materials are not destroyed rapidly by the teeth, letting these valves far outlast existing valves. This eliminates the constant need to frequently inspect and replace faulty valves, and to regularly carry numerous spare replacements and properly dispose of discarded valves.

Users can hydrate at a more relaxed pace, greatly reducing aspiration of liquids.

Only the tooth-friendly barrel contacts teeth. Other valve components are protected and do not contact the user or their teeth.

Only a slight separation of the gasket and sleeve end—easily produced by a very short and easily-applied bite—is required to provide copious flow when suction is applied. This makes drinking easier, and gives the user far better control of flow. Steps taken to minimize internal friction within the valve help make this possible.

The primarily laminar outflow is more easily directed by the user to where it is desired within the mouth.

The materials I have described herein are generally approved for use by NSF International and the U.S. FDA. These materials can be sterilized by steam or boiling hot water or by immersion in mouthwash or other anti-bacterial liquids. A valve is easily cleaned or replaced in the field. It is manually threaded into a hose coupling, thereby requiring no tools. A hose coupling contains an optional filter element to stop debris from entering a user's mouth.

Though PTFE is preferred, the outer barrel can be made of another similarly laterally-compressible, soft, but durable, low-friction, non-toxic material, possibly another fluoroplastic, such as FEP (Fluoronated Ethylene Propylene) if a fully non-toxic version is available. Similarly, the internal components of the valve can be made of other rigid materials, including metals and other plastics. Instead of providing fins, a version with no fins can be made. Instead of threads, the distal end of the barrel can mate with a standard barbed hose fitting or a spring-loaded hose coupling.

The mechanism of the current valve could be combined with an attached locking grip mechanism to enable a user to allow and control flow through other types of hoses such as garden hoses or laboratory hoses.

For many years, military users have sought to find a way to allow soldiers to hydrate safely while wearing gas masks. The current valve, with its secure airtight (though low-pressure) seal, may help them to fill that need.

Instead of water, an attached reservoir may contain another fluid such as a sport drink, a gas such as oxygen, a medicinal or recreational vapor or mist, and even a vacuum. The ability to deliver this variety of substances is made possible by the secure seal in my design.

Thus the scope should be determined by the appended claims and their legal equivalents, rather than the examples and particulars given.

The invention claimed is:

1. A method for delivering fluids to a user who has a mouth, opposing teeth, and pressable lips, comprising:
   providing a reservoir that contains said fluids,
   providing a bite valve with proximal and distal ends, wherein said valve comprises a tubular barrel with an exterior indented bite zone, a stem with a rounded nub portion that is axially movable within said barrel, a gasket secured to said stem,
   a tubular sleeve that is secured within said barrel, wherein said sleeve comprises a sharpened proximal end and a flange at a distal end
   a spring, and a cap,
   providing a hose connector,
   providing a conduit between said reservoir and said hose connector, and
   connecting said hose connector to said distal end of said valve,
   wherein when said valve is in a closed condition said spring bears against said cap and said flange, urging said stem in a distal direction and causing said proximal end of said sleeve to securely contact said gasket, thereby preventing fluid from flowing from said reservoir, through said conduit, and through said valve, and
   wherein when said user bites said valve in said bite zone, presses said lips around said barrel, and applies suction at said proximal end of said barrel, said bite zone deforms and urges two opposing sides of said inner proximal barrel surface into sliding contact with said rounded nub portion of said stem, thereby urging said stem to move in a proximal direction so that said gasket and said sharpened proximal end of said sleeve are no longer in contact so that fluid flows from said reservoir, through said conduit, through said valve and into said mouth, and
   wherein when said user releases said bite on said valve, said valve returns to said closed condition.

2. The method of claim 1 wherein when said user releases said bite on said barrel, said spring urges said stem in a distal direction, thereby causing said sleeve and said gasket to come into contact and close said valve.

3. The method of claim 1 wherein said barrel is made of materials selected from the group consisting of non-toxic PTFE, virgin PTFE and other laterally-compressible, soft but durable non-toxic fluoroplastics.

4. The method of claim 1 wherein said stem is made of materials selected from the group consisting of non-toxic acetal plastics or other rigid, high-strength, low-friction, fluoroplastics.

5. The method of claim 1, further including providing a filter element within said hose connector.

6. The method of claim 1, further including providing a protruding circular ridge inside said barrel and adjacent said bite zone, wherein when said user bites said bite zone with a first bite force, said protruding circular ridge is urged against said stem without opening said valve, and wherein when said user bites said bite zone with a second bite force that is stronger than said first bite force, said valve is opened.

7. The method of claim 1, further including providing a bite-rest zone adjacent said bite zone.

8. A bite valve for fluids, comprising:
   a laterally-compressible, tubular barrel having proximal and distal ends, further including an indented external bite zone, an internal conical surface near said proximal end, and an internal groove,
   a tubular rigid sleeve with a sharpened proximal end and a flanged distal end, wherein said flanged end of said sleeve is fixedly secured within said groove in said barrel and sealed against flow of said fluids to the outside of said sleeve with an o-ring,
   a rigid stem having proximal and distal ends that is constrained to slidably move axially within said barrel and through said sleeve, said stem having a fluted portion aligning axially with said sleeve,
   a cap secured to said stem at said distal end,
   a spring constrained to slidably engage said cap and bear against said cap and said distal end of said sleeve,
   a gasket secured to said stem,
   wherein when said valve is in a closed condition, said stem is urged in a distal direction by said spring, thereby causing said gasket to come into firm sealing contact with said sharpened end of said sleeve and preventing said fluid from flowing through said valve, and
   wherein when a user applies a bite force to said bite zone, said barrel is deformed urging two opposing sides of said conical surface of said barrel against said stem, thereby moving said stem in a proximal direction and removing said gasket from contact with said sleeve and causing said valve to be in an open condition and allowing said fluid to flow through said valve, and
   wherein when said bite force is removed from said barrel said valve returns to said closed condition.

9. The valve of claim 8 wherein said barrel is made from materials selected from the group consisting of virgin polytetrafluoroethylene, non-toxic PTFE, and other laterally-compressible, soft but durable non-toxic, low-friction fluoroplastics.

10. The valve of claim 8 wherein said stem is made of materials selected from the group consisting of acetal copolymer, acetal homopolymer, natural polysulfone and other low-friction, non-toxic fluoroplastics.

11. The valve of claim 8 wherein said gasket and said o-ring are made of materials selected from the group consisting of silicone rubber, buna-n rubber, polytetrafluoroethylene, ethylene propylene, and polyurethane.

12. The valve of claim 8 wherein said barrel has an internal proximal unsloped surface which further includes an internal protruding circular ridge, whereby when said user applies a first bite force in said bite zone, said protruding circular ridge contacts said stem without opening said valve, and when said user applies a second bite force that is greater than said first bite force, said bite zone is deformed so that a then conically-deformed portion of said inner wall of said proximal end of said barrel urges said stem in a proximal direction, thereby opening said valve.

13. The valve of claim 8 further including a bite-rest zone.

14. A hydration system, comprising:
a reservoir for containing fluids,
a conduit connected to said reservoir,
a connector connected to said conduit,
a bite valve, wherein said bite valve is connected to said connector,
wherein said bite valve comprises:
a laterally-compressible, tubular barrel having proximal and distal ends, further including an indented external bite zone, an internal conical surface at said proximal end, and an internal groove,
a tubular sleeve with a sharpened proximal end and a flanged distal end, wherein said flanged end of said sleeve is fixedly secured within said groove in said barrel and sealed against flow of said fluids to the outside of said sleeve with an o-ring,
a rigid stem having proximal and distal ends that is constrained to slidably move axially within said barrel,
a cap secured to said stem at said distal end,
a spring constrained to slidably engage said cap and bear against said cap and said distal end of said sleeve,
a gasket secured to said stem,
wherein when said valve is in a closed condition, said stem is urged in a distal direction by said spring, thereby causing said gasket to come into firm sealing contact with said sharpened end of said sleeve and preventing said fluid from flowing through said valve, and
wherein when a user applies a bite force to said bite zone, said barrel is deformed urging two opposing sides of said conical surface of said barrel against said stem, thereby moving said stem in a proximal direction and removing said gasket from contact with said sleeve and causing said valve to be in an open condition and allowing said fluid to flow through said valve, and
wherein when said bite force is removed from said barrel said valve returns to said closed condition.

15. The hydration system of claim 14, wherein said distal end of said bite valve is threaded and said connector is threaded so that said bite valve and said connector can be threadably joined and threadably disconnected for cleaning or replacement.

16. The hydration system of claim 15 wherein said bite valve is threadably removable for cleaning or replacement.

17. The hydration system of claim 14, further including a hose clamp, wherein said distal end of said bite valve is smooth or barbed and said bite valve is joined to said connector by said hose clamp.

* * * * *